(12) United States Patent
Miyamoto et al.

(10) Patent No.: US 7,694,466 B2
(45) Date of Patent: Apr. 13, 2010

(54) SOLAR CELL UNIT ATTACHING APPARATUS

(75) Inventors: Shinsuke Miyamoto, Tokyo (JP); Hiroyoshi Takikawa, Tokyo (JP); Naoki Ito, Tokyo (JP); Takeshi Takada, Tokyo (JP); Kouji Shimasaki, Tokyo (JP)

(73) Assignee: Mitsubishi Denki Kabushiki Kaisha, Chiyoda-Ku, Tokyo (JP)

( * ) Notice: Subject to any disclaimer, the term of this patent is extended or adjusted under 35 U.S.C. 154(b) by 1020 days.

(21) Appl. No.: 10/568,689

(22) PCT Filed: Aug. 12, 2004

(86) PCT No.: PCT/JP2004/011623

§ 371 (c)(1),
(2), (4) Date: Feb. 17, 2006

(87) PCT Pub. No.: WO2006/016412

PCT Pub. Date: Feb. 16, 2006

(65) Prior Publication Data

US 2008/0169018 A1 Jul. 17, 2008

(51) Int. Cl.
*E04D 13/18* (2006.01)

(52) U.S. Cl. .......................... 52/173.3; 52/235; 52/468; 52/476; 126/623

(58) Field of Classification Search ................ 52/173.3, 52/235, DIG. 17, 461, 460, 464, 468, 476, 52/475.1
See application file for complete search history.

(56) References Cited

U.S. PATENT DOCUMENTS 5,065,557 A * 11/1991 Laplante et al. ............... 52/235

FOREIGN PATENT DOCUMENTS

| JP | 10-004207 | | 1/1998 |
|---|---|---|---|
| JP | 10-159284 | A | 6/1998 |
| JP | 10-183899 | A | 7/1998 |
| JP | 11-006262 | | 1/1999 |
| JP | 2000-261017 | | 9/2000 |
| JP | 2001-040845 | | 2/2001 |
| JP | 2001-065120 | | 3/2001 |
| JP | 2001-65121 | A | 3/2001 |
| JP | 2003-298098 | | 10/2003 |
| JP | 2003-336357 | | 11/2003 |

OTHER PUBLICATIONS

Supplementary European Search Report Application/Patent No. 04771598.2-1528 (PCT/JP2004011623) dated Feb. 18, 2008.
International Search Report (with English translation of category of cited documents) dated Sep. 28, 2004.
Written Opinion dated Sep. 28, 2004.

* cited by examiner

*Primary Examiner*—Jeanette E Chapman
*Assistant Examiner*—Daniel Kenny
(74) *Attorney, Agent, or Firm*—Buchanan Ingersoll & Rooney PC (57) ABSTRACT

An apparatus for holding a plurality of solar cell units includes a mounting member to be fixed onto a roof, a plurality of fixtures, and a frame member having to-be-sandwiched portions to be sandwiched and fixed between the mounting member and the fixtures, and grooves that support the ends of the plate-shaped solar cell units. The to-be-sandwiched portions of the frame members are positioned inside projection plane regions that project the solar cell units and the grooves immediately below, whereby the distance between adjacent solar cell units reduces.

5 Claims, 14 Drawing Sheets

SOLAR CELL UNIT ATTACHING APPARATUS

This application is based on International Application No. PCT/JP2004/11623, filed on Aug. 12, 2004 designating the U.S., the entire content of which is hereby incorporated by reference.

TECHNICAL FIELD

The present invention relates to a solar cell unit attaching apparatus for attaching plate-shaped solar cell units including a plurality of solar cells onto a roof or the like.

BACKGROUND ART

Figure 15:
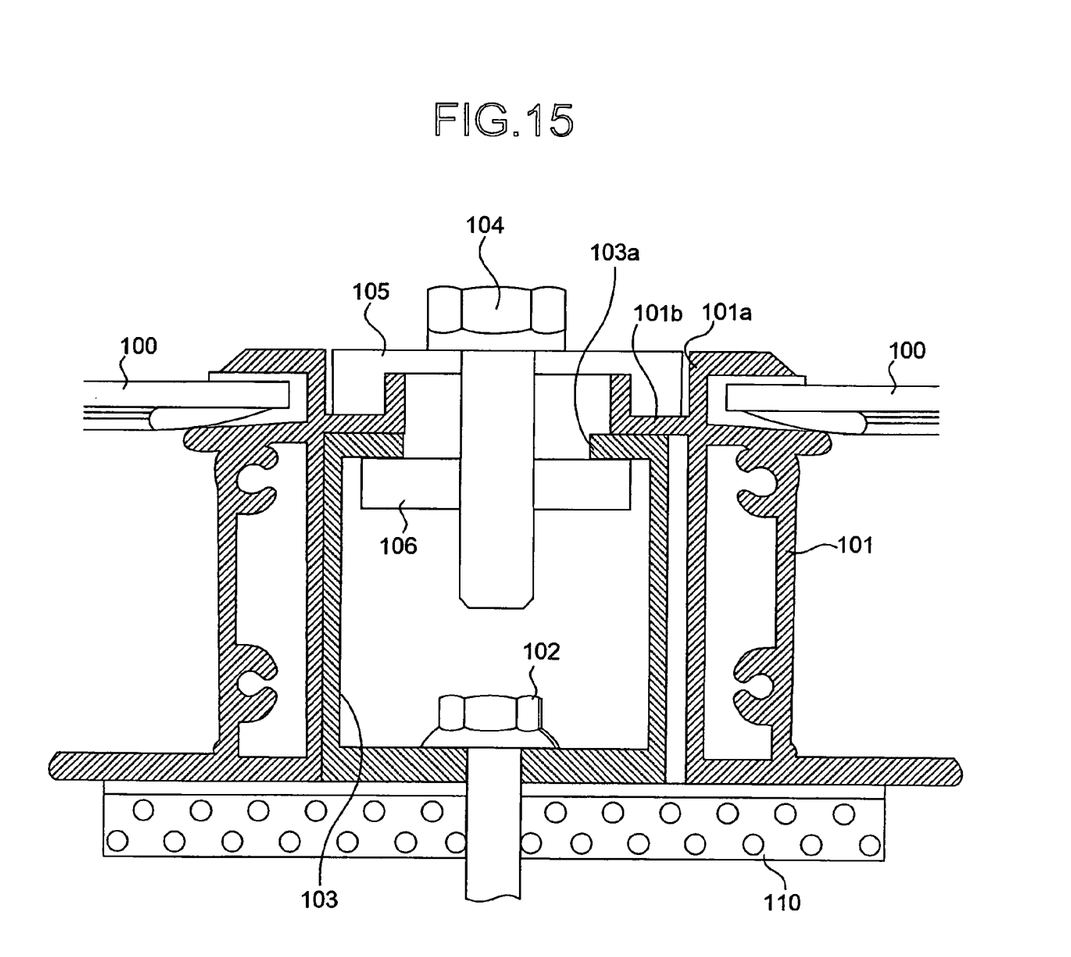
FIG. 15 is a sectional view of a conventional system.
Figure 16:
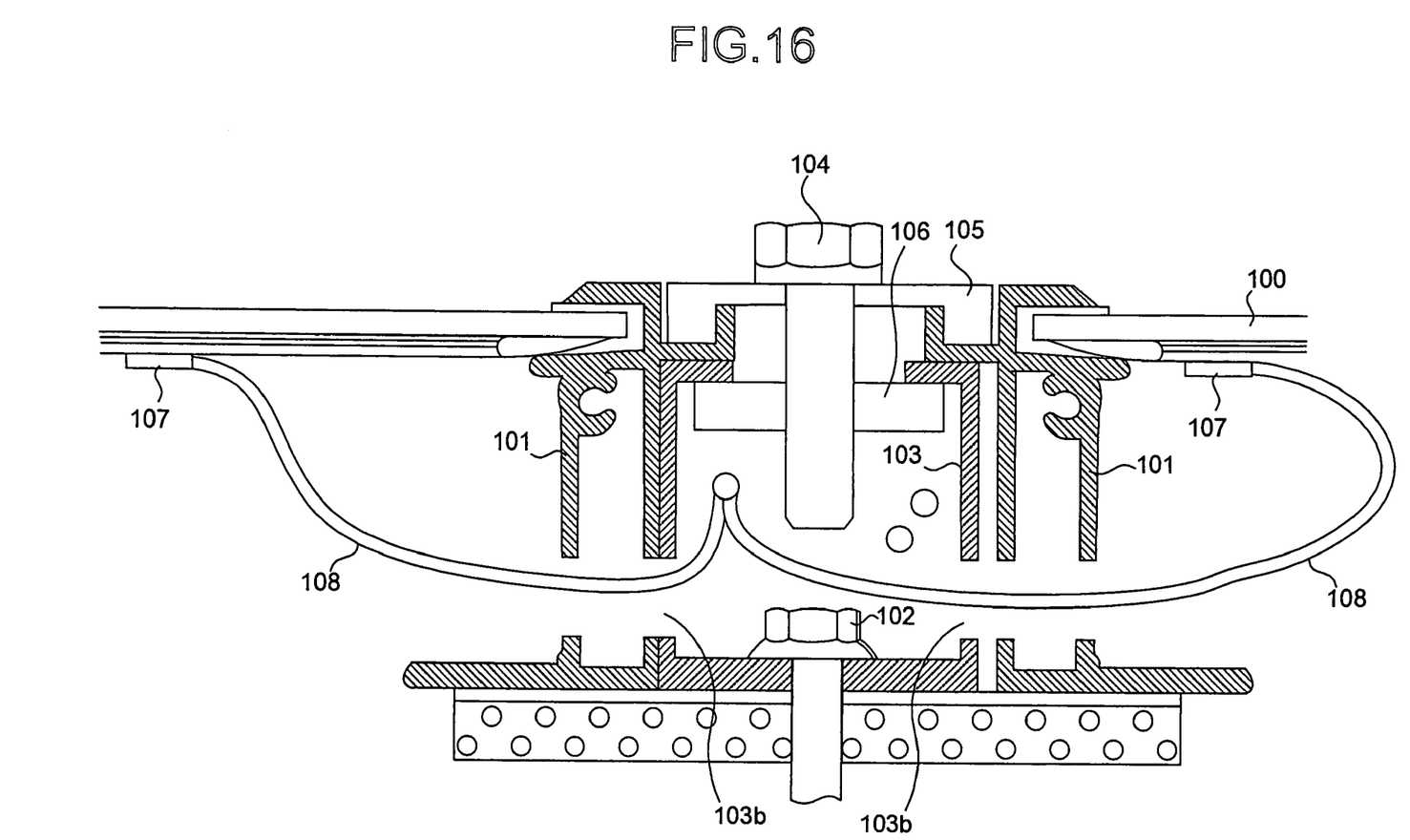
FIG. 16 is another sectional view of the conventional system.

A solar cell module includes a solar cell unit having a plate-shaped solar cell main body consisting of solar cells, and frame members having frame bodies to be attached to the ends of the solar cell unit. Conventionally, Patent Document 1 discloses an attaching structure for attaching such a solar cell module onto a roof. FIG. 15 and FIG. 16 depict an attaching structure for a solar cell module shown in Patent Document 1.

As shown in FIG. 15, solar cell units (solar cell main bodies) 100 are fitted into fitting portions 101a of frame bodies 101, whereby solar cell modules are formed. A C-shaped mount 103 with its open side facing upward is fixed with a screw 102 onto a roof, via waterproof rubber 110. Flange portions 101b of the frame bodies 101 are placed on upper surfaces 103a of the C-shaped mount 103. The flange portions 101b of the frame bodies 101 and the upper surfaces 103a of the C-shaped mount 103 are sandwiched and fixed between a between-module cover 105 and a module fastening 106 by fastening a cover fixing bolt 104, whereby solar cell modules adjacent to each other are fixed to the C-shaped mount 103.

Patent Document 1 discloses that, as shown in FIG. 16, the inside of the C-shaped mount 103 is used as an electrical wiring space of the solar cell modules. Namely, electrical cables 108 to be connected to terminal boxes 107 of adjacent solar cell modules are guided to the inside of the C-shaped mount 103 via a connecting hole 103b formed in the lower portion of the C-shaped mount 103, and these electrical cables 108 are properly connected. By loosening the cover fixing bolt 104 and removing the between-module cover 105 and the module fastening 106, the internal space of the C-shaped mount 103 is exposed, and then wire connection is made.

Patent Document 1: Japanese Published Unexamined Patent Application No. H10-159284

DISCLOSURE OF INVENTION

PROBLEM TO BE SOLVED BY THE INVENTION

However, in the conventional art described above, on the frame body 101, a flange portion 101b is formed to project to the outside of the solar cell module from the frame body 101 on the opposite side of the fitting portion 101a that supports the solar cell unit 100, and the frame body 101 is fixed to the C-shaped mount 103 so that the flange portion 101b is placed on the upper surface 103a of the C-shaped mount 103. Therefore, in the conventional art, at least a total length of projecting lengths of facing two flange portions 101b plus the diameter of the screw portion of the cover fixing bolt 104 is needed as a distance between adjacent solar cell modules, so that the distance of a non-power-generating area between the solar cell modules increases, and the size of the whole photovoltaic system consisting of solar cell modules increases.

Moreover, in the conventional art, the connecting hole 103b is formed in the lower portion of the C-shaped mount 103, and electrical cables 108 are housed inside the C-shaped mount 103. Thus, the electrical cables 108 are positioned deep from the between-module cover 105, and cable housing, extraction, and connection is difficult. Furthermore, in the conventional art described above, because two flange portions 101b project to the gap between the solar cell modules, even after the cover fixing bolt 104 is loosened and the between-module cover 105 and the module fastening 106 are removed, the opening becomes narrow, and workability in cable housing and extraction, etc. reduces.

The invention was made in view of these circumstances, and an object thereof is to obtain a solar cell unit attaching apparatus which can realize a photovoltaic system that occupies as little space as possible and achieves high efficiency, by shortening distances between the solar cell modules and reducing the non-power-generating area. Still another object of the invention is to obtain a solar cell unit attaching apparatus with high workability in which cable connection, housing, and extraction is easy.

MEANS FOR SOLVING PROBLEM

To solve the above problems, and to achieve the above objectives, the present invention provides a solar cell unit attaching apparatus that includes a long-length mount to be fixed onto a roof; a plurality of fixtures; and frame members including to-be-sandwiched portions to be sandwiched and fixed between the mount and the fixtures and unit supports that support the ends of plate-shaped solar cell units, where in the frame members, the to-be-sandwiched portions are formed so as to be positioned inside projection plane regions that project solar cell units and the unit supports of the frame members immediately below these.

EFFECT OF THE INVENTION

In a solar cell unit attaching apparatus according to the invention, to-be-sandwiched portions of the frame members are formed so as to be positioned inside the projection plane regions that project solar cell units and unit supports of the frame members immediately below these, so that the distance between adjacent solar cell units is shorter than in the conventional technology. Therefore, the non-power-generating area is small, whereby the photovoltaic system occupies as less space as possible.

EXPLANATIONS OF LETTERS OR NUMERALS

1 Solar cell module
2 Solar cell unit (solar cell main body)
3 Frame member (longer side)
3a Bush (electrical cable inserting hole)
3c Groove
3d Lower extending portion
3e To-be-sandwiched portion
3f Upper plate
4 Frame member (shorter side)
5 Terminal box
6 Electrical cable
7 Connector
10 Mount
20 Mount fixture
30 Module fixture
35 Fastening bolt
40 Between-module cover
50 Module fixture
60 Between-module cover
70 Front cover

BEST MODE(S) FOR CARRYING OUT THE INVENTION

Exemplary embodiments of a solar cell unit attaching apparatus according to the invention are explained in detail below, with reference to the accompanying drawings. The invention should not be limited to these embodiments.

First Embodiment

Figure 1:
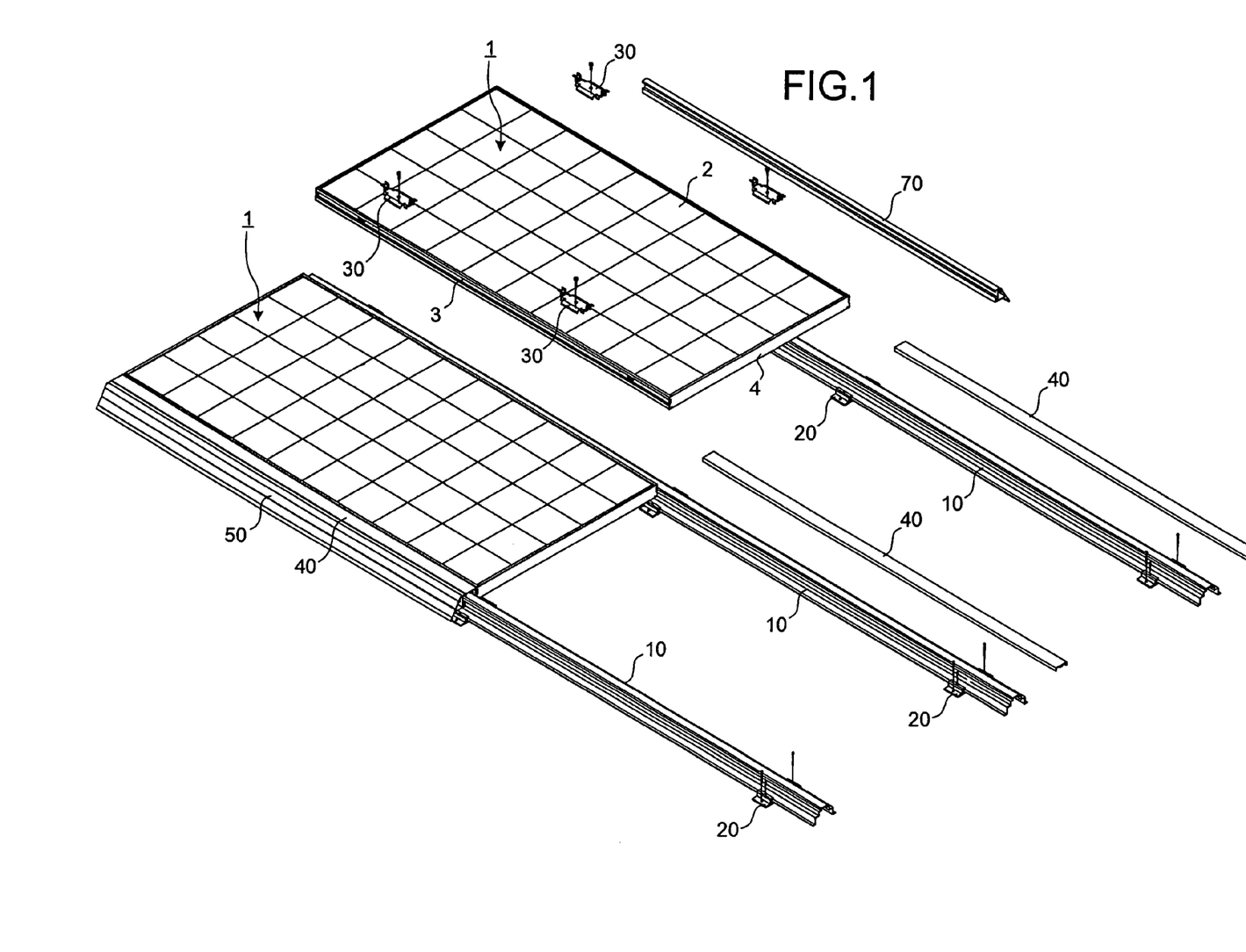
FIG. 1 is an exploded perspective view of components in a photovoltaic system to which a first embodiment of the invention is applied.
Figure 4:
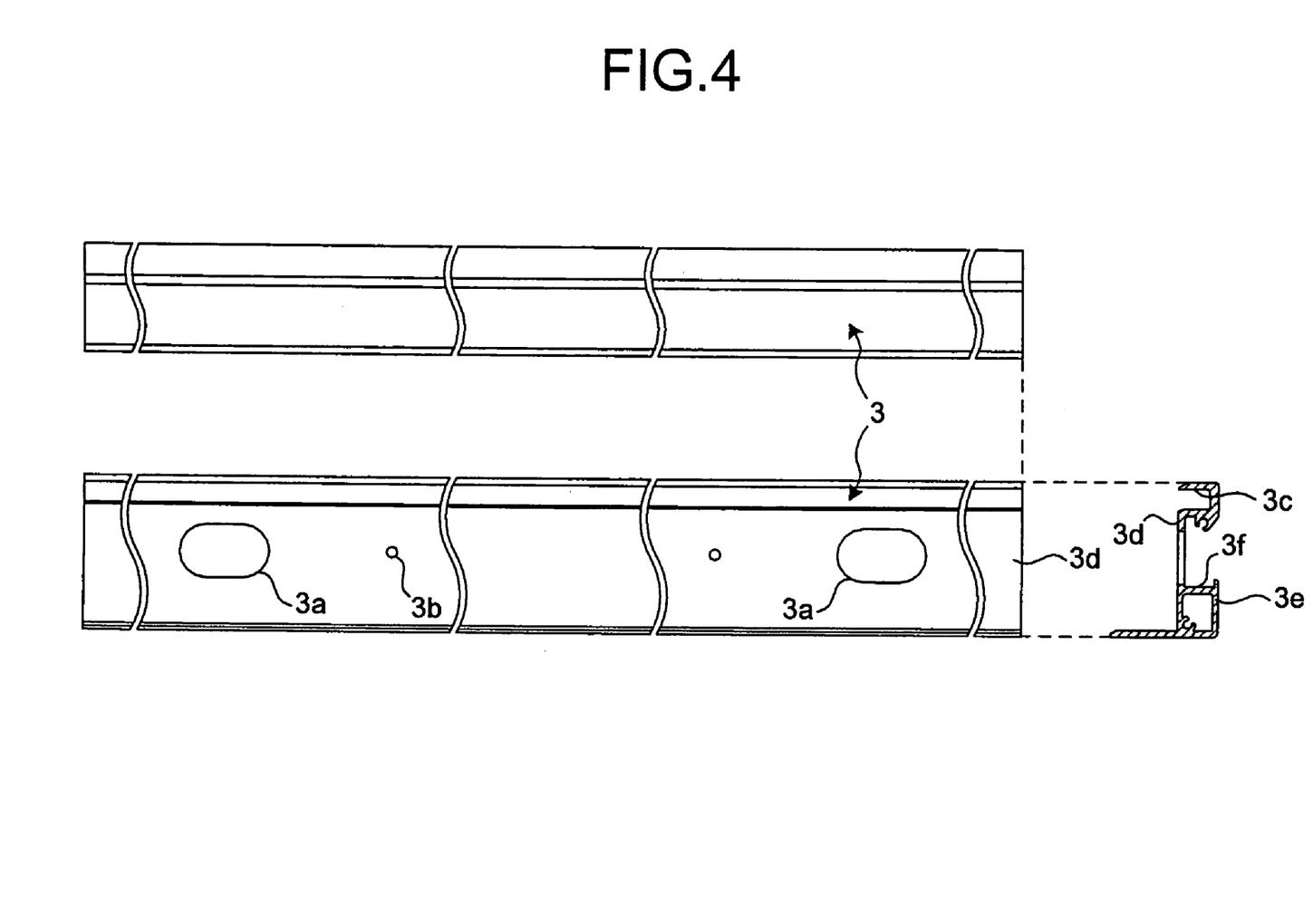
FIG. 4 is an isometric view of a longer side frame member.
Figure 5:
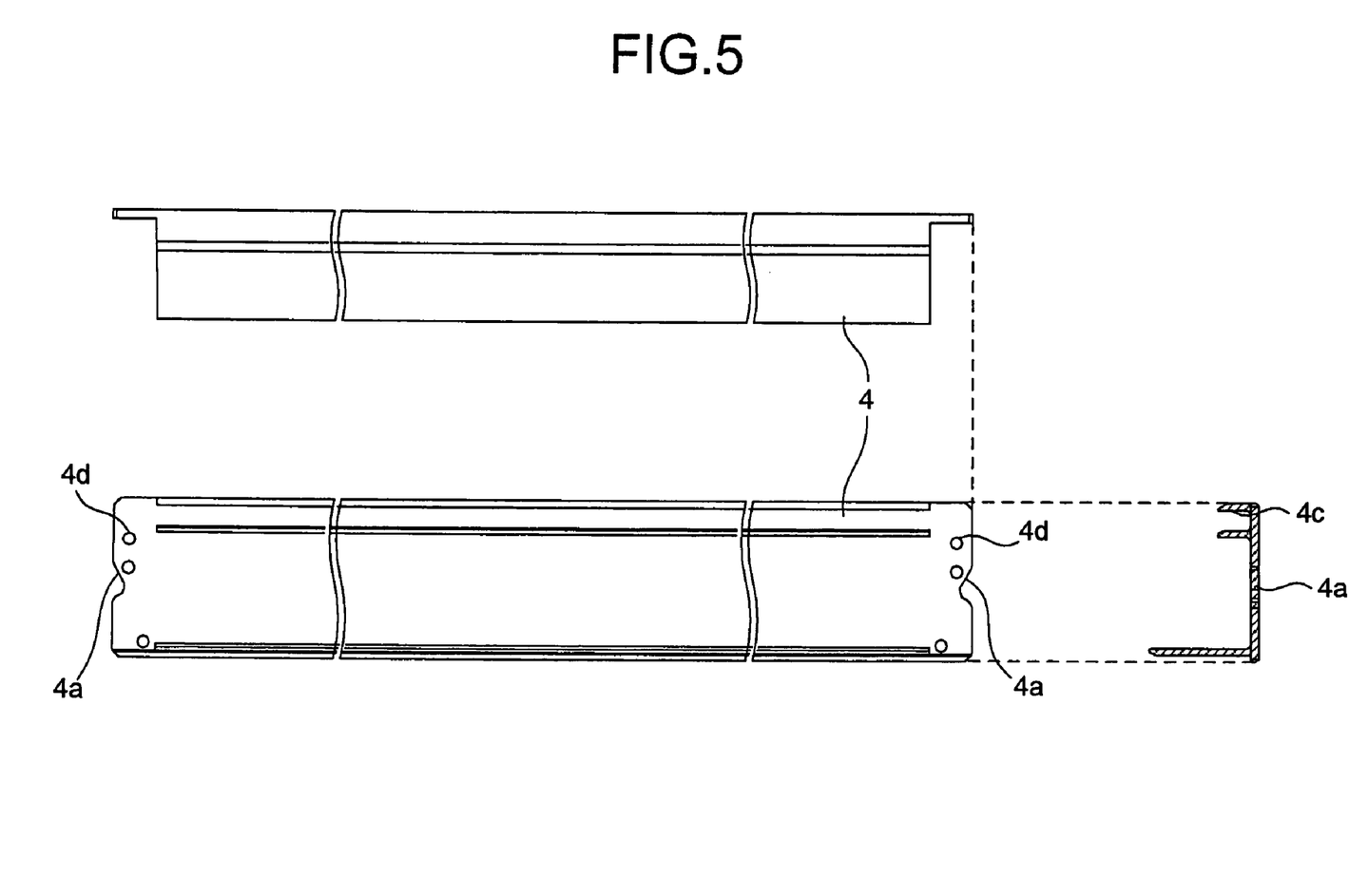
FIG. 5 is an isometric view of a shorter side frame member.
Figure 6:
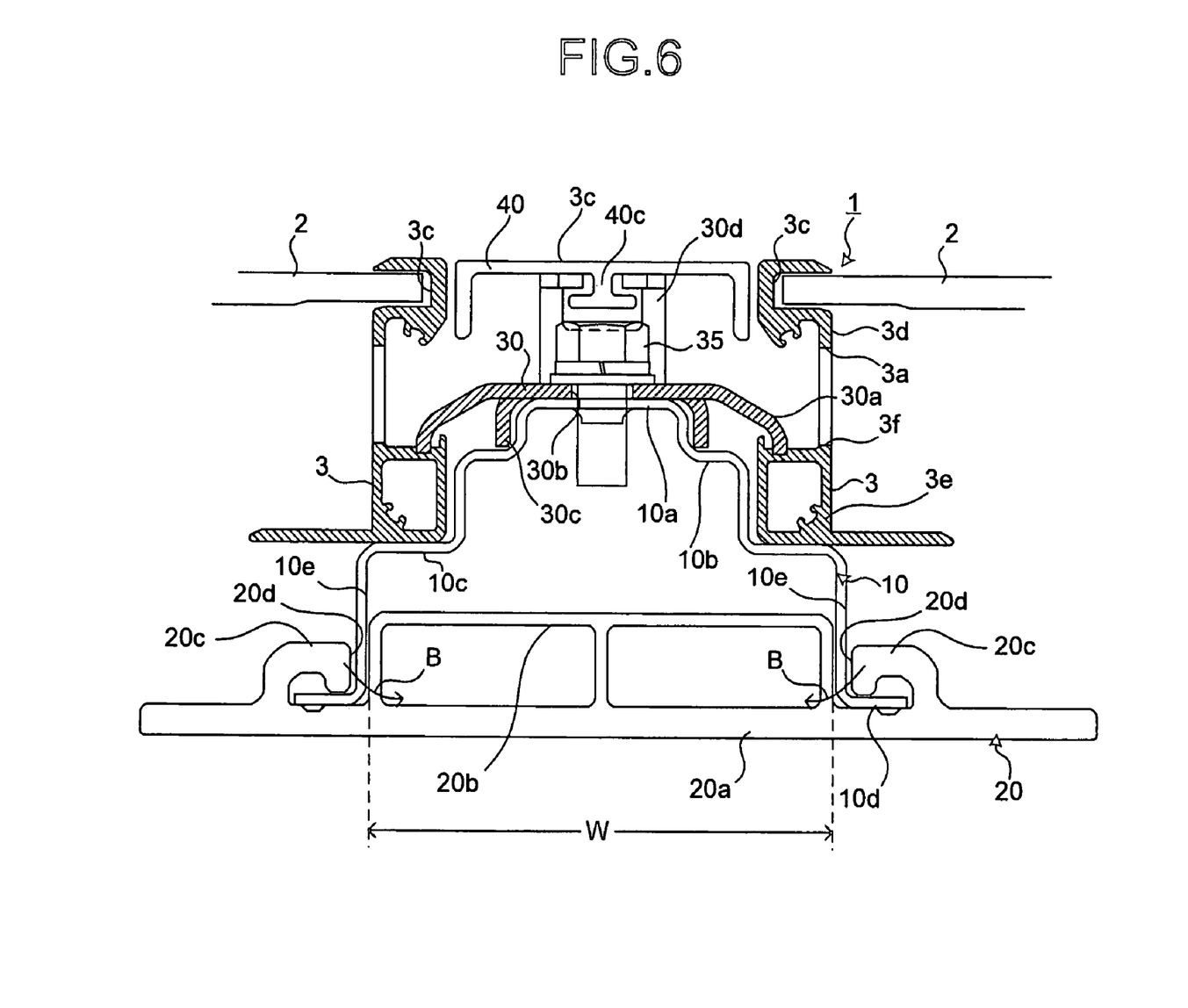
FIG. 6 is a sectional view of a main part of a solar cell unit attaching apparatus according to the first embodiment of the invention.
Figure 7:
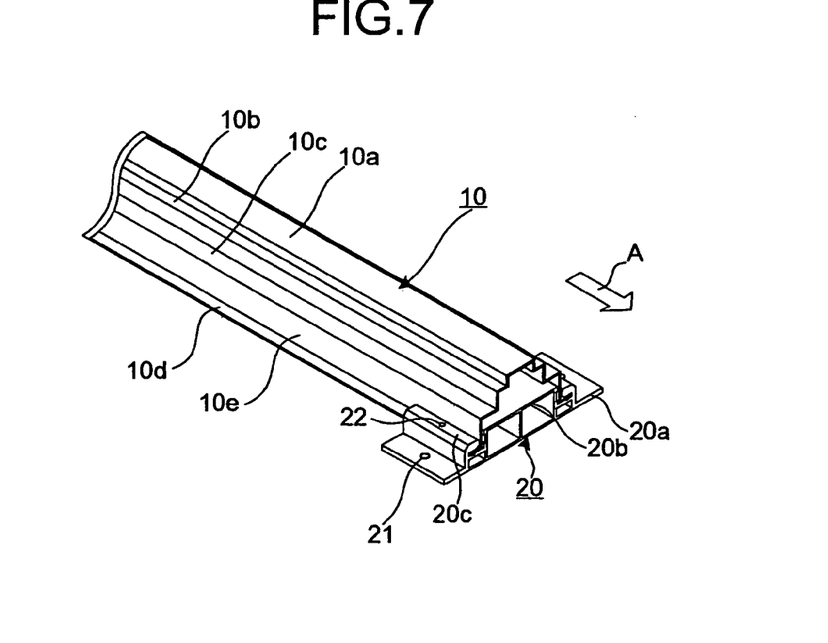
FIG. 7 is a perspective view of joining a mount and a mount fixture according to the first embodiment.
Figure 8:
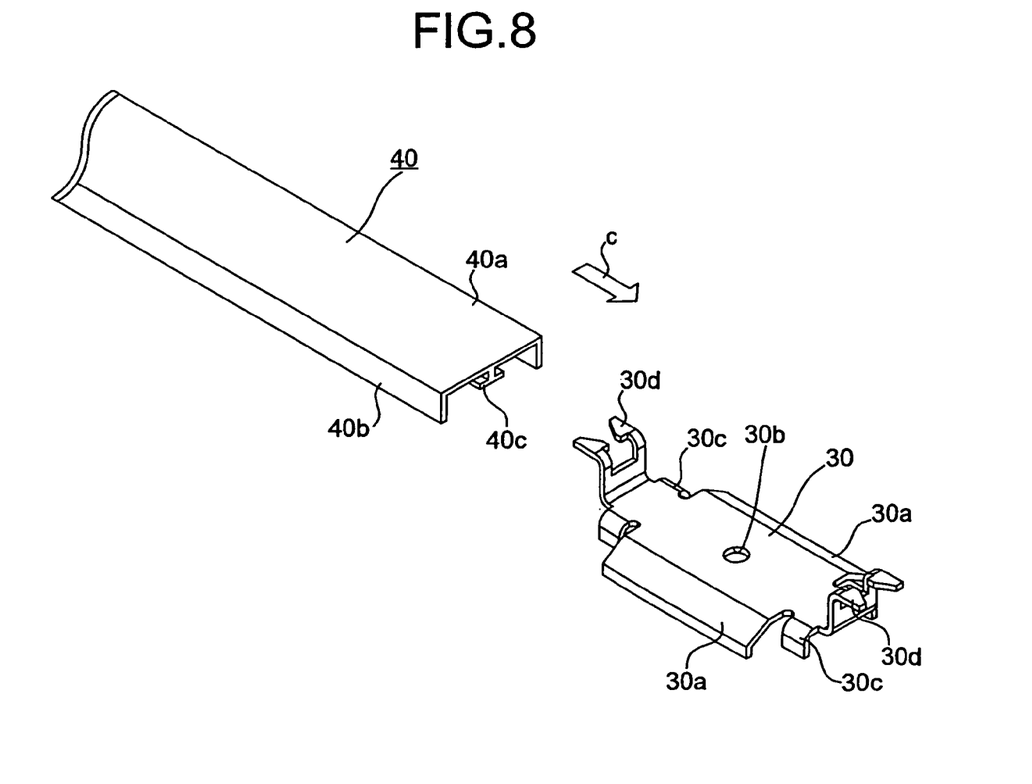
FIG. 8 is a perspective view of joining a module fixture and a between-module cover according to the first embodiment.
Figure 9:
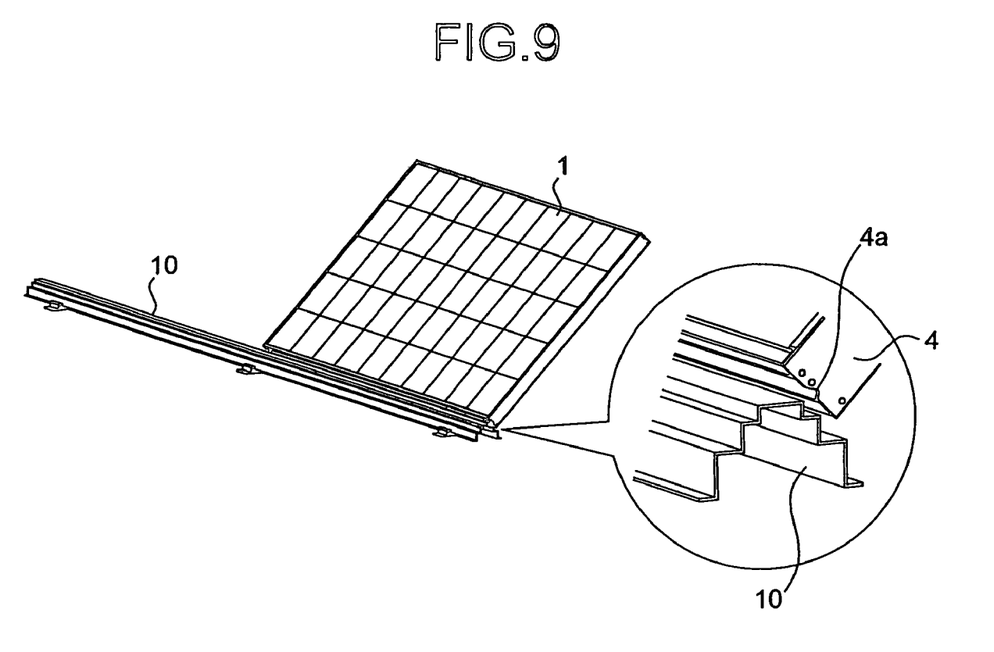
FIG. 9 is a perspective view for explaining procedures of setting a solar cell module onto the mount.
Figure 10:
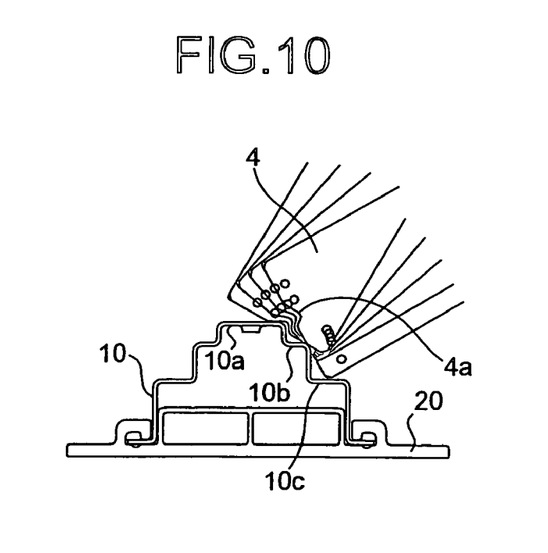
FIG. 10 is a front view for explaining procedures of setting the solar cell module onto the mount.
Figure 11:
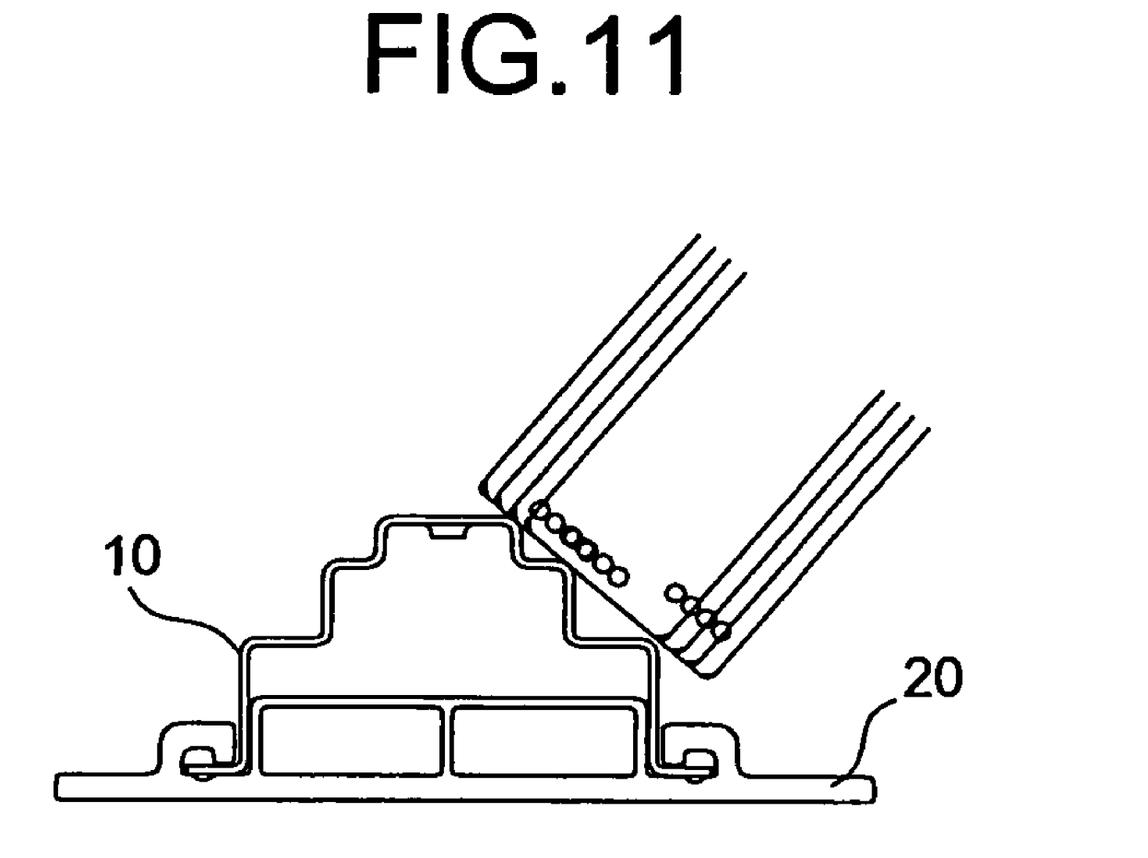
FIG. 11 is a front view for explaining a problem when a frame member without a notch is used.

FIG. 1 is a drawing of the construction of a solar cell unit attaching apparatus according to a first embodiment of the invention. The first embodiment of the invention is explained with reference to FIG. 1 though FIG. 11. FIG. 1 is an exploded perspective view of components, FIG. 2 is a drawing of connection of electrical cables between adjacent solar cell modules, FIG. 3 is an entirely general sectional view of a solar cell unit attaching apparatus, FIG. 4 is an isometric view of a longer side frame member, FIG. 5 is an isometric view of a shorter side frame member, FIG. 6 is a sectional view of a main part of the solar cell unit attaching apparatus, FIG. 7 is a perspective view of joining a mount and a mount fixture, FIG. 8 is a perspective view of joining a module fixture and a between-module cover, FIG. 9 is a perspective view for explaining procedures of setting a solar cell module onto the mount, FIG. 10 is a front view for explaining procedures of setting the solar cell module onto the mount, and FIG. 11 is a front view for explaining a problem when a frame member without a notch is used.

Figure 2:
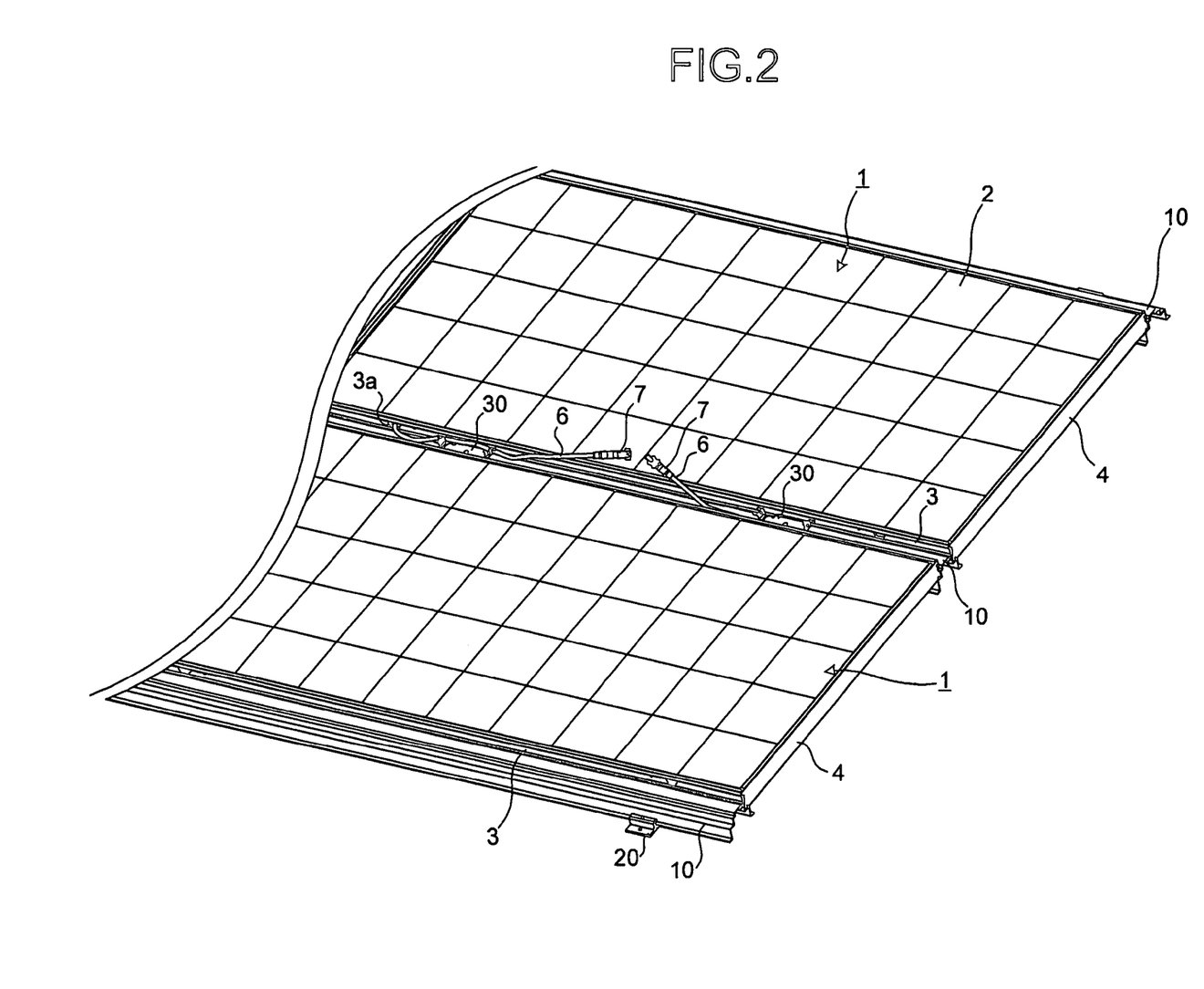
FIG. 2 is a perspective view of a layout between adjacent solar cell modules.
Figure 3:
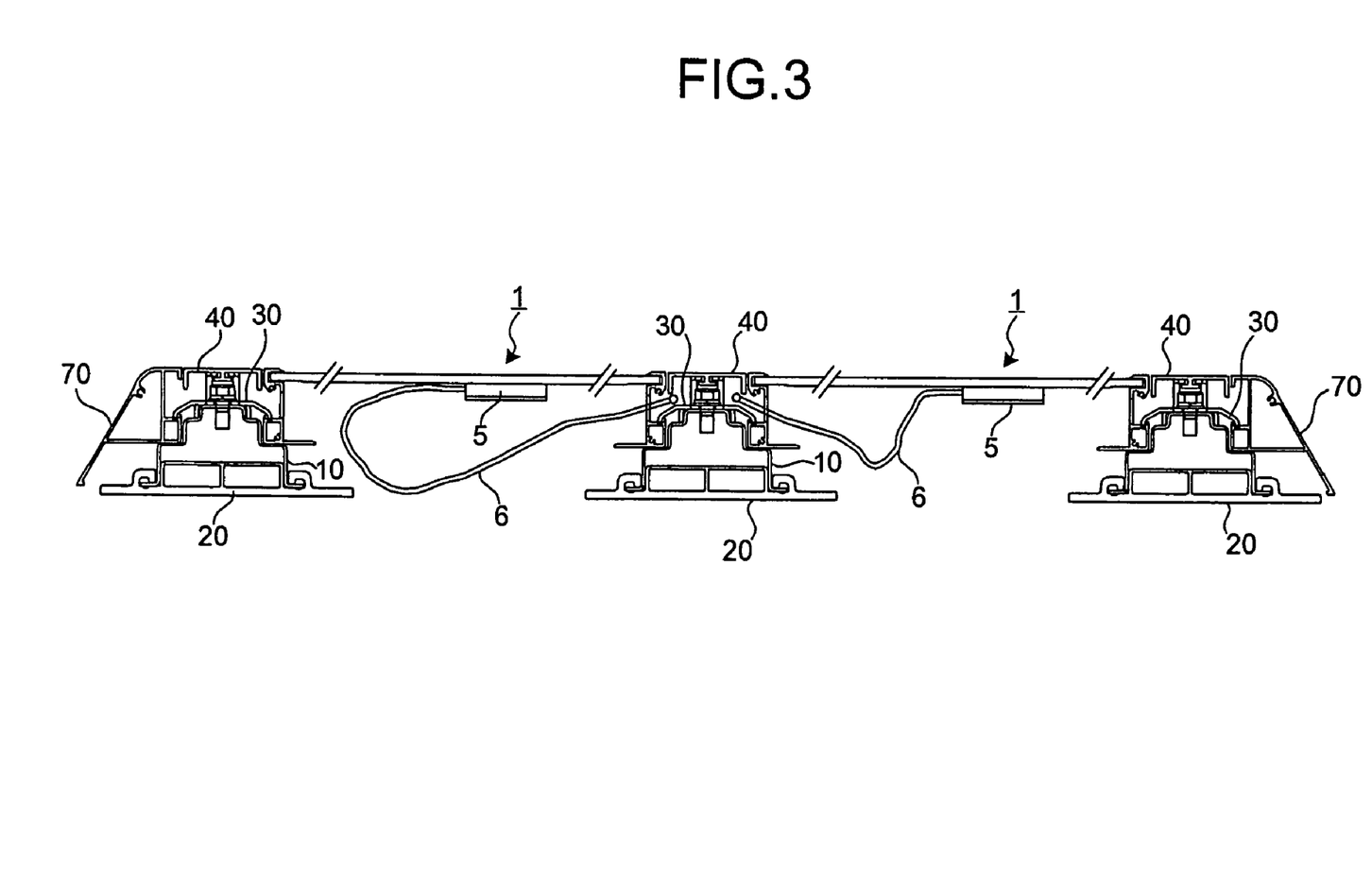
FIG. 3 is a sectional view of the layout between adjacent solar cell modules.

As shown in FIG. 1 through FIG. 3, the system construction of the first embodiment includes a plurality of solar cell modules 1, mounts 10 that are long, convex upward, and open at the lower side, and support the solar cell modules 1, a plurality of mount fixtures 20 that fix the mounts 10 to a roof at a plurality of points, module fixtures 30 that fix the solar cell modules 1 at the points, between-module covers 40 provided between the solar cell modules 1 to obtain internal protection and fine external appearance, front covers 70 provided at the front portion and the rear portion, and so on.

The solar cell module 1 includes a solar cell unit 2 as a solar cell main body, and frame members 3 and 4 as frame bodies. The solar cell unit 2 has a rectangular plate shape, and includes a plurality of solar cells arranged in a matrix, a protective glass plate, a weather proof film, and so on. One or a plurality of terminal boxes 5 are provided on the back surface of the solar cell unit 2, and electrical cables 6 for extracting electrical output are connected to the terminal boxes 5. Connectors 7 are connected to the front ends of the electrical cables 6, as shown in FIG. 2.

The frame members to be attached to the ends of the solar cell unit 2 include a pair of longer side frame members 3 and a pair of shorter side frame members 4. As shown in FIG. 4, a plurality of bushes 3a are formed as holes for inserting the electrical cables 6 and ground line fixing holes 3b, in the longer side frame member 3. At the upper portion of the frame member 3, there is a groove 3c with a C-shaped section, in which the longer side end of the solar cell unit 2 is fitted. The sectional shape of the longer side frame member 3 is the main part of the invention, and details thereof are described later.

As shown in FIG. 5, notches 4a are formed at approximately the center of both ends of the shorter side frame member 4. A groove 4c with a C-shaped section, in which the shorter side end of the solar cell unit 2 is fitted, is formed at the upper portion of the shorter side frame member 4. The shorter side frame member 4 also includes a plurality of screw holes 4d for a screw-joint with the longer side frame members 4.

FIG. 6 is an enlarged view of the solar cell unit attaching apparatus, which is at the center among the three solar cell unit attaching apparatuses shown in FIG. 3. In FIG. 6, the mount 10 that is long and convex upward and has steps is fixed to a roof with a plurality of the mount fixtures 20 as also shown in FIG. 1. FIG. 7 also depicts the joining the mount 10 and the mount fixture 20. In this case, the mount 10 has an opening on its lower side and has an upward convex shape with three steps, and includes a top face (upper surface) 10a of the highest step, base plates 10b of the second step, base plates 10c, and seating portions 10d of the first step.

On the other hand, on the mount fixture 20, a bottom plate 20a, a convex portion 20b projecting from the center of the bottom plate 20a, and a pair of mount pressers 20c having a hook (latching) shape raised at both sides of the convex portion 20b from the bottom plate 20a are formed. In this case, the mount presser 20c is approximately C-shaped by bending its front end, however, it may be L-shaped by eliminating the bent front end. The width W of the convex portion 20b is set so that the side walls of the convex portion 20b come into contact with side plates 10e that is raised from the seating portions 10d of the first step of the mount 10. Guide gaps 20d are formed between the mount pressers 20c and the bottom plate 20a, and between the front ends of the mount pressers 20c and the side walls of the convex portion 20b. The seating portions 10d and the side plates 10e of the first step of the mount 10 are fitted in the guide gaps 20d, by sliding the mount 10 in the direction of arrow A, shown in FIG. 7.

When attaching the mount 10 to a roof, for example, first, the mount fixtures 20 are set on desired points on the roof, screws are inserted into screw holes 21 of the mount fixtures 20, and the mount fixtures 20 are screw-fixed onto the roof. Next, the mount 10 is inserted to the mount fixtures 20, and then screws are inserted into screw holes 22 formed in the mount pressers 20c, and the mount 10 is screw-fixed to the mount fixtures 20. Of course, it is also possible that the mount fixtures 20 are inserted to the mount 10 and screw-fixed to the roof, and then the mount 10 is screw-fixed to the mount fixtures 20.

In the mount fixture 20, not only are the seating portions 10d of the mount 10 pressed from above by the mount pressers 20c, but also deformation of the side plates 10e of the first step toward the inner side of the first step is prevented by providing the convex portion 20b that comes into the side plates 10e at the inner side of the side plates 10e of the first step of the mount 10, and by the convex portion 20b that serves as a stopper. Namely, if the solar cell module 1 is blown up by strong wind and an external upward force acts on the solar cell module 1, the external upward force also acts on the upward convex mount 10 and lifts it up. When such an external force acts, the lower end sides of the side plates 10e of the first step of the mount 10 will tend to bend inward as shown by the arrows B.

When this deformation is about to occur, if the convex portion 20b to serve as a stopper is not formed on the mount fixture 20, the side plates 10e of the first step deform in the directions shown by the arrows B, and hence, the mount 10 comes off the mount fixture 20. On the other hand, according to the first embodiment, because the convex portion 20b is provided at the inner side of the side plates 10e of the first step of the mount 10 and the convex portion 20b is made to serve as a stopper against deformation of the side plates 10e of the first step, even when the external force acts, the mount 10 can be reliably prevented from coming off the mount fixtures 20.

Next, the sectional shape of the longer side frame member 3 of the solar cell module 1 is explained with reference to FIG. 6, etc. As described above, at an upper part of the frame member 3, the groove 3c is formed as a unit support that supports the solar cell unit 2 by fitting the end of the solar cell unit 2 therein. That is, by fitting the end of the solar cell unit 2 in the groove 3c, the solar cell unit 2 is fixed to the frame member 3. A clearance is formed between the solar cell unit 2 and the frame member 3, and the clearance is sealed by an adhesive rubbery sealing material or caulking.

The frame member 3 includes a downward extending portion 3d that bends almost perpendicularly to the lower plate of the groove 3c from the end of the lower plate and extends downward. In this case, the downward extending portion 3d is bent from the end of the lower plate of the groove 3c, however, it is also possible that the downward extending portion 3d is formed from the middle of the lower plate by further extending the lower plate of the groove 3c toward the solar cell unit 2 side so as to stabilize seating of the solar cell unit 2 onto the frame member 3. As shown in FIG. 4, the bushes 3a are formed in the downward extending portion 3d, as holes for inserting the electrical cables 6.

The frame member 3 has a to-be-sandwiched portion 3e that is sandwiched and fixed between the mount 10 and the module fixture 30 at the lower side of the downward extending portion 3d. In this case, the to-be-sandwiched portion 3e is formed into a quadrangular prism shape sandwiched and fixed between the base plate 10c of the first step of the mount 10 and a fastening portion 30a of the module fixture 30. The to-be-sandwiched portion 3e is formed to project almost perpendicularly from the downward extending portion 3d toward the disposition side of the module fixture 30 to secure a predetermined fastening margin between the mount 10 and the module fixture 30. In this case, the to-be-sandwiched portion 3e is of a quadrangular prism shape, however, it may also have a plate shape.

Here, the frame member 3 is L-shaped from the end of the lower plate of the groove 3c so that the to-be-sandwiched portion 3e is positioned inside a projection plane region that projects the solar cell unit 2 and the groove 3c of the frame member 3 immediately below these except for the extending region of the solar cell unit 2. In other words, the to-be-sandwiched portion 3e is formed immediately below the end of the solar cell unit 2 except for the extending region of the solar cell unit 2. Therefore, with this construction, the required distance between adjacent solar cell modules 1 corresponds to only the screw portion diameter of a fastening bolt 35, so that the distance between adjacent solar cell modules 1 can be made shorter than in the conventional system.

FIG. 8 is an exploded view of the module fixture 30 and the between-module cover 40. A bolt hole 30b in which the fastening bolt 35 is screwed is formed at the center of the module fixture 30, and comparatively long fastening portions 30a that come into contact with upper plates 3f of the to-be-sandwiched portions 3e of the frame members 3 are formed in the module fixture 30. In addition, short-length auxiliary fastening portions 30c that come into contact with the base plates 10b of the second step of the mount 10 are formed at both side ends of the module fixture 30. Guide supports 30d that guide the sliding movement of the between-module cover 40 by engaging with a rail 40c of the between-module cover 40 and support the between-module cover 40 are provided at both ends of the module fixture 30. In this case, the module fixture 30 is formed of a thin sheet of metal plate.

The between-module cover 40 is provided between solar cell modules 1 for obtaining internal protection and excellent external appearance, and includes an upper plate 40a with a flat upper surface, side plates 40b, and the rail 40c as a T-shaped guide rail. The rail 40c is formed at the center of the lower surface side of the upper plate 40a of the between-module cover 40. In the conventional art shown in FIG. 15 in which the head of the bolt is exposed to the outside, power generation obstructions, such as snow, cover the solar cell modules 1 and obstruct power generation. However, the upper surface of the between-module cover 40 has a flat shape for protection from power generation obstructions, such as snow, that cover the solar cell modules 1 and obstruct power generation. The use of the between-module cover 40 with a flat upper surface is also preferable in terms of external appearance.

Next, procedures of fixing the solar cell modules 1 to the mount 10 are explained with reference to FIG. 9 and FIG. 10. The solar cell modules 1 include the solar cell unit 2 to which the longer side frame members 3 and the shorter side frame members 4 are fixed. To set the solar cell modules 1 on the mount 10 that is fixed to the roof by the mount fixtures 20, as shown in FIG. 9 and FIG. 10, for example, the notch 4a of the shorter side frame member 4 and concave portions (portions surrounded by the lower plates of the grooves 3c, the downward extending portions 3d, and the upper plates 3f of the to-be-sandwiched portions 3e) of the longer side frame members 3 are engaged with the corner of the top face 10a of the mount 10. Then, the solar cell module 1 is rotated around the corner of the base plate 10b of the second step of the mount 10, and the end of the solar cell module 1 is placed on the base plate 10c of the first step as shown in FIG. 6. As shown in FIG. 4 and FIG. 5, the notches 4a of the shorter side frame members 4 are formed at almost the same height as the concave portion of the longer side frame member 3, and the notches 4a and the concave portion of the longer side frame member 3 form a concave portion engageable with the step of the upward convex mount 10.

With this construction, the solar cell module 1 can be easily placed on the mount 10 without slipping off the mount 10, while setting. Note that, if the notches 4a are not formed, as shown in FIG. 11, the solar cell module 1 can frequently slip off the mount 10, resulting in low workability.

With two solar cell modules 1 and 1 are thus placed on both sides of the mount 10, one module fixture 30 is placed so that the auxiliary fastening portions 30c are positioned on the base plates 10b of the second step of the mount 10 and the fastening portions 30a are positioned on the upper plates 3f of the to-be-sandwiched portions 3e of the frame members 3, and the fastening bolt 35 is inserted in the bolt hole 30b of the module fixture 30 and fastened. Thus, the frame members 3 of the solar cell modules 1 are sandwiched and fixed between the module fixture 30 and the mount 10. In the same manner, the two solar cell modules 1 are fixed to both sides of the mount 10 by using a plurality of the module fixtures 30.

Thus, the pair of solar cell modules 1 are set on both sides of one mount 10 as shown in FIG. 2. Electrical cables 6 connected to the terminal boxes 5 are drawn out of the bushes 3a formed in the frame members 3 before fixing the solar cell modules 1 to the mount 10. Next, the two electrical cables 6 thus drawn-out are connected by a connector 7, to thereby electrically connect the adjacent solar cell modules 1 to each other.

In this apparatus, as shown in FIG. 2 and FIG. 3, the bushes 3a for drawing-out the electrical cables 6 are provided on the frame member 3, and the drawn-out electrical cables 6 are housed in a space surrounded by the pair of facing frame members 3 and the upward convex mount 10. Therefore, the electrical cable housing position is shallower than in the conventional art, so that the cable connection, housing, and extraction are extremely easily performed. In the space between the solar cell modules 1, flange portions 101b of the conventional art (see FIG. 15) are not provided, so that the opening becomes larger and improves the workability in cable housing and extraction, etc.

Next, the rail 40c of the between-module cover 40 is inserted into the guide supports 30d of a plurality of the module fixtures 30 as shown by the arrow C of FIG. 8 to set the between-module cover 40 between the solar cell modules 1. Thereby, the setting of the solar cell modules 1 adjacent to each other is complete.

As shown in FIG. 3, at the front portion and the rear portion where the front covers 70 are attached, the module fixture 30 is fastened with the fastening bolt 35 in the state in that the solar cell module 1 is set on one side of the mount 10 and the front cover 70 is set on the other side, the front cover 70 is sandwiched and fixed between the module fixture 30 and the mount 10 as well as the solar cell module 1. Likewise, by attaching the between-module cover 40 to the module fixtures 30, the between-module cover 40 is set between the solar cell modules 1 and the front cover 70.

As described above, according to the first embodiment, the to-be-sandwiched portion 3e of the frame member 3 is positioned inside a projection plane region that projects the solar cell unit 2 and the groove 3c of the frame member 3 immediately below these, so that the required distance between the adjacent solar cell modules 1 basically corresponds to only the screw diameter of the fastening bolt 35. Therefore, the distance of a non-power-generating area between the adjacent solar cell modules 1 can be made shorter than in the conventional system. In addition, by providing the bushes 3a on the frame members 3 for drawing-out the electrical cables 6, the electrical cables 6 are housed in a space surrounded by a pair of facing frame members 3 and the upward convex mount 10. Therefore, the electrical cables can be housed at a shallow position close to the opening, and the cable connection, housing, and extraction is extremely easy.

Second Embodiment

Figure 12:
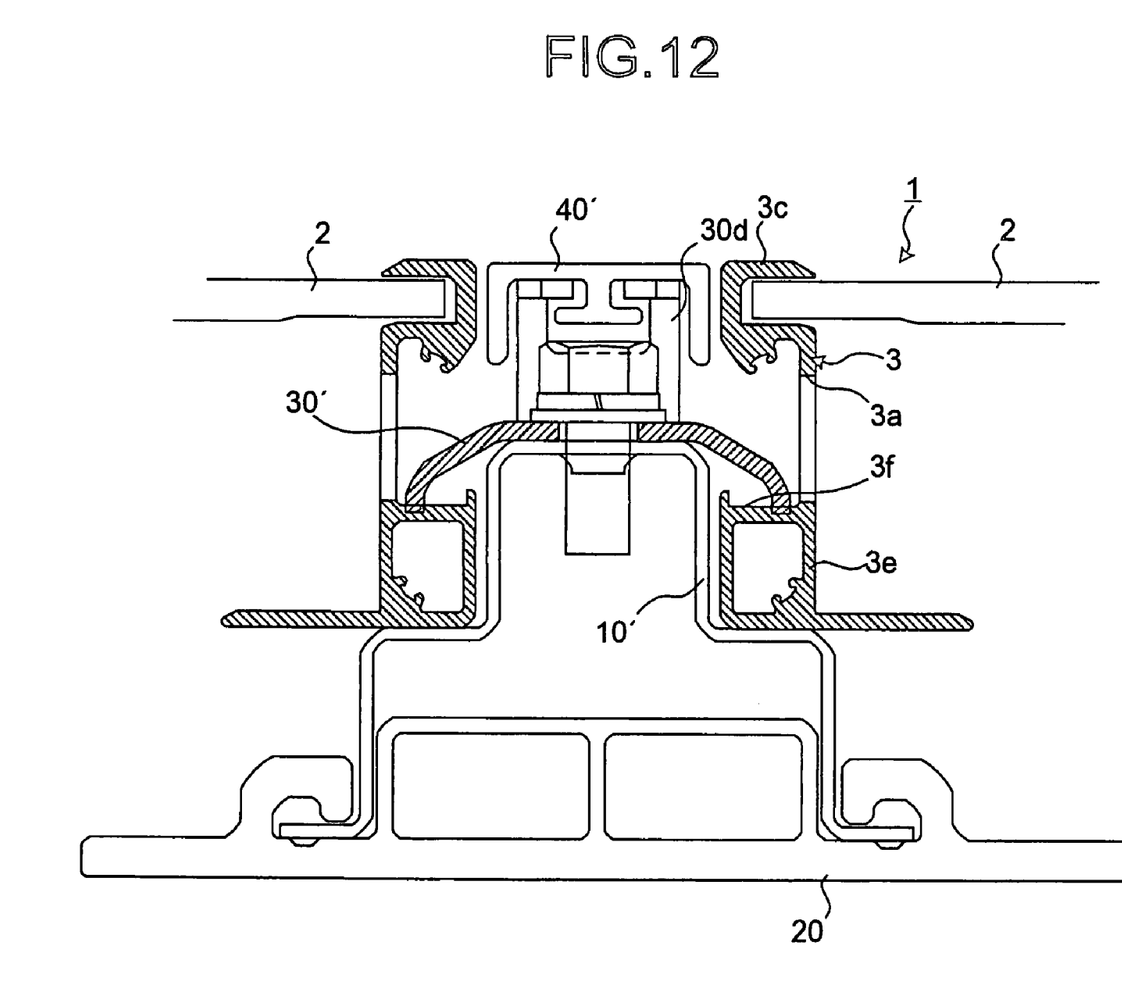
FIG. 12 is a sectional view of a main part of a solar cell unit attaching apparatus according to a second embodiment of the invention.

Next, a second embodiment of the invention is explained with reference to FIG. 12. FIG. 12 is a partial sectional view of a main part of a solar cell unit attaching apparatus according to the second embodiment. In the second embodiment shown in FIG. 12, the distance between the solar cell modules 1 is set shorter than in the first embodiment.

Namely, a mount 10' that is upward convex with two steps, and a module fixture 30' obtained by omitting the auxiliary fastening portions 30c from the module fixture 30 of the first embodiment are used. Therefore, the mount 10', the module fixture 30', and the between-module cover 40' that are narrower in width than those of the first embodiment can be employed, and it becomes possible to further shorten the distance between the solar cell modules 1. Components that perform the same functions as in the first embodiment have the same symbols, and description thereof is omitted here.

Third Embodiment

Figure 13:
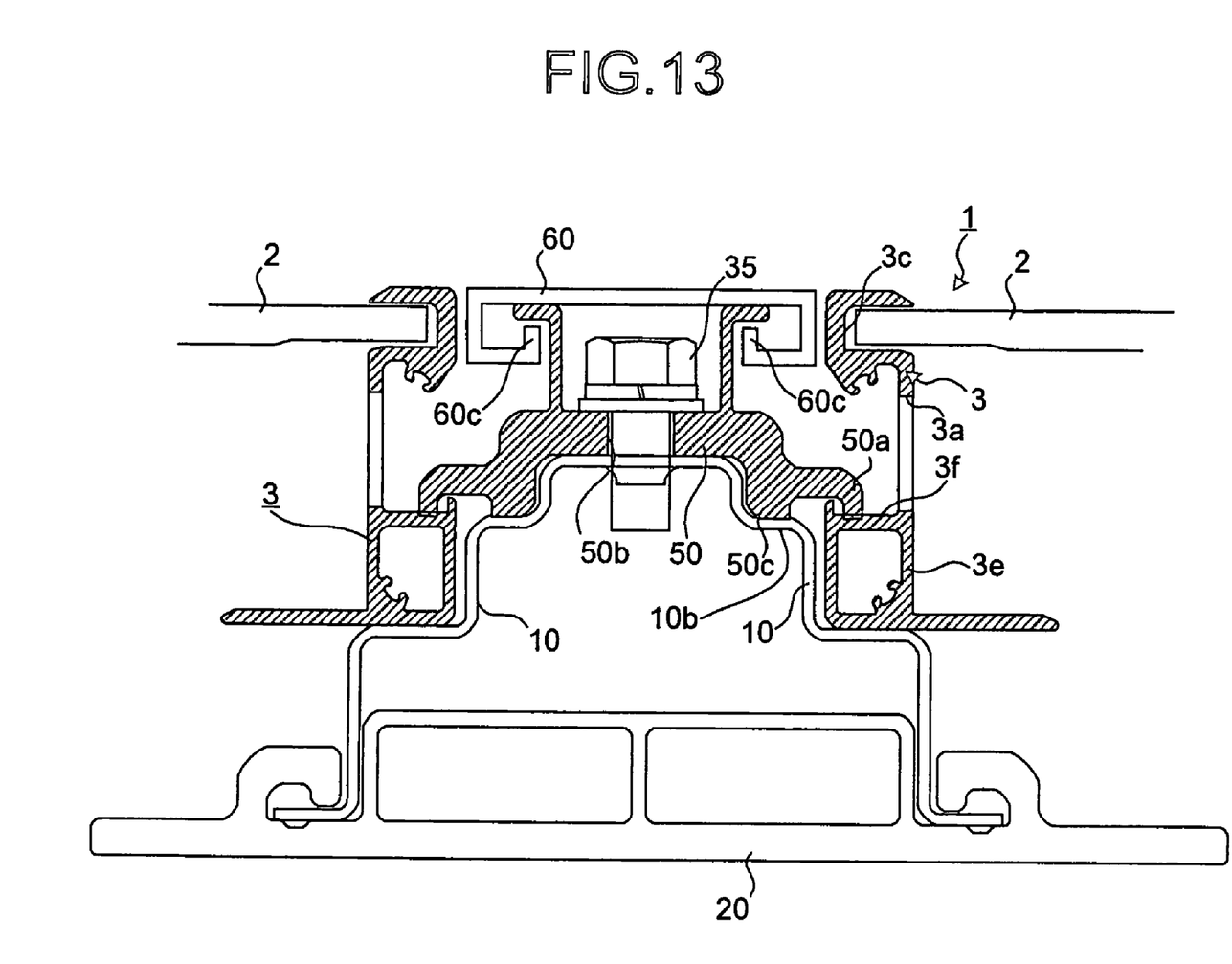
FIG. 13 is a sectional view of a main part of a solar cell unit attaching apparatus according to a third embodiment of the invention.
Figure 14:
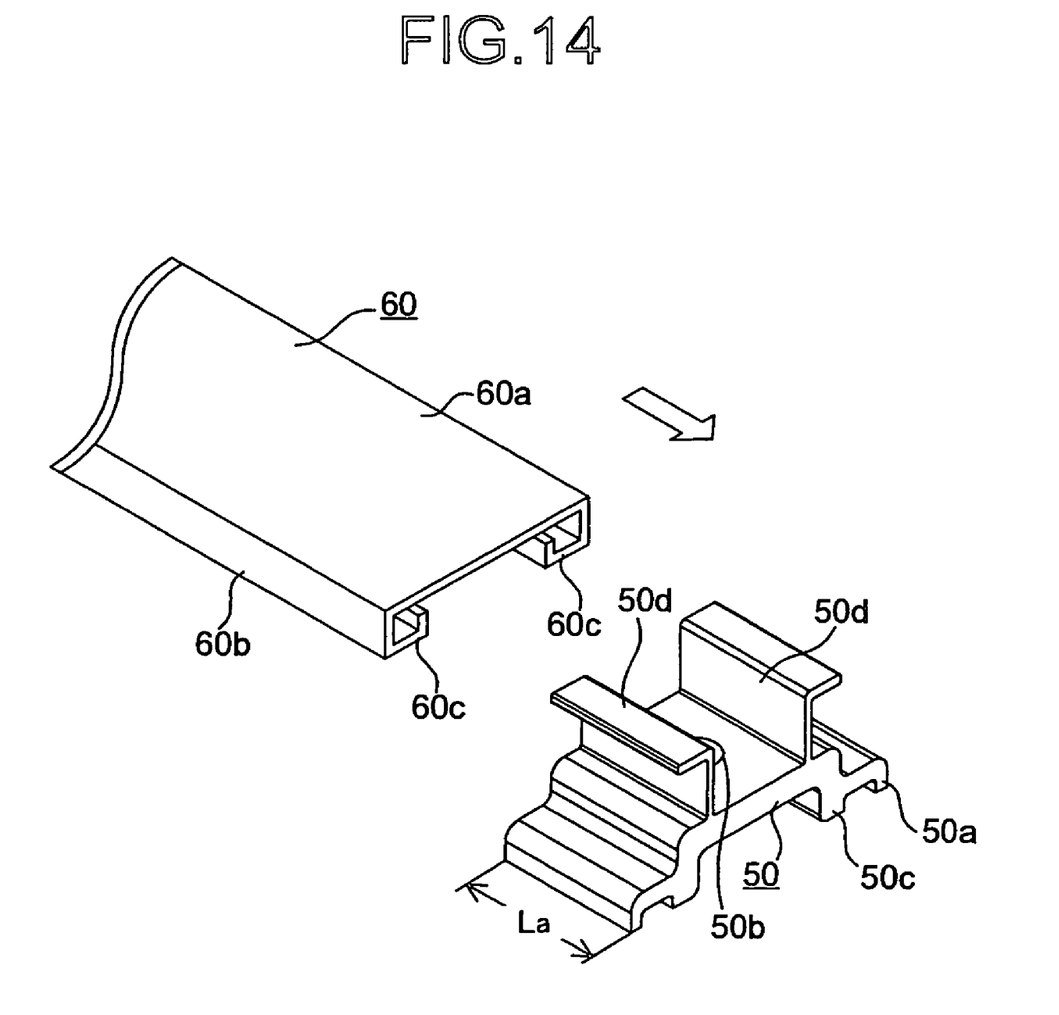
FIG. 14 is a perspective view of joining a module fixture and a between-module cover according to the third embodiment.

Next, a third embodiment of the invention is described with reference to FIG. 13 and FIG. 14. FIG. 13 is a partial sectional view of a main part of a solar cell unit attaching apparatus according to the third embodiment. FIG. 14 is a perspective view of joining a module fixture 50 and a between-module cover 60.

The module fixture 50 and the between-module cover 60 of the third embodiment are different in shape from the module fixture 30 and the between-module cover 40 of the first embodiment. Other components are the same as those of the first embodiment, and description thereof is omitted here.

The between-module cover 60 includes an upper plate 60a with a flat upper surface, side plates 60b, and rails 60c that are L-shaped guide rails. The rails 60c are formed at both sides of the between-module cover 60.

The module fixture 50 is thicker than the module fixture 30. In the module fixture 50, a bolt hole 50b to screw the fastening bolt 35 is formed at the center, and furthermore, fastening portions 50a to come into contact with the upper plates 3f of the to-be-sandwiched portions 3e of the frame members 3 are formed at both side ends, and auxiliary fastening portions 50c to come into contact with the base plates 10b of the second step of the mount 10 are formed at the inner sides of the fastening portions 50a. L-shaped guide supports 50d that engage with the pair of rails 60c of the between-module cover 60, to guide the sliding movement of the between-module cover 60 and support the between-module cover 60, are formed as the upper surface of the module fixture 50.

In this case, the length La of the module fixture 50 is set so that the module fixture 50 can be put between the solar cell modules 1 and 1, that is, between a pair of facing frame members 3 and 3, upon rotating the module fixture 50 by 90° degrees around the bolt hole 50b from the state of FIG. 13 and FIG. 14. Namely, in the state of FIG. 13, the module fixture 50 cannot be put between the solar cell modules 1 and 1, but the module fixture 50 is rotated first by 90° degrees and then put between the solar cell modules 1 and 1, and further rotated by 90° degrees so as to be set at the regular position. After bolt fixation of the module fixture 50 is complete, the between-module cover 60 is inserted in and fixed to the module fixture 50.

INDUSTRIAL APPLICABILITY

As described above, the solar cell unit attaching apparatus of the invention is useful for a photovoltaic system to be set on a roof or housetop.

The invention claimed is:

1. An apparatus for holding a plurality of solar cell units that are plate-shaped, comprising:
    a roof mount fixture configured to be fixed onto a roof;
    a mounting member configured to be fixed to the roof mount fixture and including at least one side plate;
    a plurality of modules; and
    a frame member including to-be-sandwiched portions configured to be sandwiched and fixed between the mounting member and the fixture, and unit supporting portions configured to support ends of the solar cell units, wherein
        the frame member includes projection plane regions configured to project the solar cell units and the unit supporting portions directly underneath,
        the to-be-sandwiched portions are positioned inside the projection plane regions,
        the roof mount fixture includes a convex portion that contacts the at least one side plate of the mounting member from an inner side of the at least one side plate for preventing a deformation of the mounting member,
        wherein, the unit supporting portion includes
        a groove in which a first end of the solar cell unit is fitted, and
        a downward extending portion that bends and extends downward from any one of a middle and an end of a lower plate of the groove substantially perpendicular to the lower plate, and the to-be-sandwiched portion projects sideward from the downward extending portion,
    the mounting member is convex in shape and has steps, and is placed such that the convex portion faces towards sunlight,
    the frame member has holes in which electrical cables of the solar cell unit are inserted, and is arranged on the steps of the mounting member, and
    a space surrounded by a pair of facing frame members and an upper surface of the mounting member houses the electrical cables.

2. The apparatus according to claim 1, wherein
the frame member includes a concave portion configured to be engaged with a step of the mounting member.

3. The apparatus according to claim 1, wherein
the modules and the mounting member are fixed with bolts, and
a cover with a flat upper surface is provided between the pair of facing frame members, for internal protection.

4. The apparatus according to claim 3, wherein
the cover includes a guide rail at its center, and
the modules include fastening portions configured to come into contact with the to-be-sandwiched portions of the frame members, and guide supports that engage with the guide rail to guide and support the cover.

5. The apparatus according to claim 3, wherein
the cover has a guide rail at each of two ends,
the modules include fastening portions configured to come into contact with the to-be-sandwiched portions of the frame members, and a pair of guide supports that engage with the guide rails to guide and support the cover, and
the modules have a length so as to be rotated by 90 degrees and arranged between the pair of facing frame members.

* * * * *